(12) United States Patent
Glehr (10) Patent No.: US 6,661,220 B1
(45) Date of Patent: Dec. 9, 2003

(54) ANTENNA TRANSPONDER CONFIGURATION FOR ANGLE MEASUREMENT AND DATA TRANSMISSION

(75) Inventor: Manfred Glehr, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/688,917

(22) Filed: Oct. 16, 2000

Related U.S. Application Data (63) Continuation of application No. PCT/DE99/01135, filed on Apr. 15, 1999.

(30) Foreign Application Priority Data

Apr. 16, 1998 (DE) .......................................... 198 16 936

(51) Int. Cl.$^7$ ............................ G01B 7/30; G01B 7/00; G01D 5/20
(52) U.S. Cl. ............................ 324/207.17; 324/207.25
(58) Field of Search ........................ 324/207.17, 207.24, 324/207.25; 340/870.31, 870.32, 870.35; 318/652, 653; 73/862.331

(56) References Cited

U.S. PATENT DOCUMENTS 2,671,892 A * 3/1954 Childs .................. 340/870.35
2,915,721 A * 12/1959 Farrand et al. ............. 336/123

FOREIGN PATENT DOCUMENTS

| DE | 36 42 607 A1 | 6/1988 |
| DE | 34 47 980 C2 | 12/1989 |
| DE | 39 22 556 C3 | 9/1994 |
| EP | 0 611 952 A1 | 8/1994 |

OTHER PUBLICATIONS

Published International Application No. WO 95/31696 (Dames et al.), dated Nov. 23, 1995.

* cited by examiner

*Primary Examiner*—Walter E. Snow
(74) *Attorney, Agent, or Firm*—Laurence A. Greenberg; Werner H. Stemer; Gregory L. Mayback

(57) ABSTRACT

An antenna transponder configuration, in particular for power transmission and angle measurement is described. The antenna transponder configuration contains a stationary antenna device having at least two concentric coils with different mean radii, the mean magnetic flux in the interior of the coils approximately canceling itself out. At least one of the coils is in this case in the form of a meandering coil. A transponder, which is disposed such that it can rotate, has a configuration of coils that are inductively coupled to the magnetic field of the meandering coil. The transponder and the antenna device are separated from one another by an air gap.

4 Claims, 10 Drawing Sheets

ANTENNA TRANSPONDER CONFIGURATION FOR ANGLE MEASUREMENT AND DATA TRANSMISSION

CROSS-REFERENCE TO RELATED APPLICATION

This is a continuation of copending International Application PCT/DE99/01135, filed Apr. 15, 1999, which designated the United States.

BACKGROUND OF THE INVENTION

Field of the Invention

The invention relates to an antenna transponder configuration for angle measurement, torque measurement, data transmission for angle position determination, signal preprocessing and angle measurement using a rotating encoder for such a configuration.

In order to measure the angle and position of a rotating shaft, Published, European Patent Application EP 0 611 952 A1 discloses an apparatus in which a sequence of different permanent magnets is provided on a ring which surrounds a rotating shaft. The sequence is coded, so that the position of the shaft can be deduced from the sequence of magnetic polarities. A stationary angle sensor is provided in order to detect the shaft position and, by interaction with the permanent magnets, produces a signal sequence from which the shaft position can be deduced. The apparatus has the disadvantage that permanent magnets must be provided on a shaft, and their polarity can be changed by strong external magnetic fields. Furthermore, the ring requires a certain physical extent in order to provide the various individual magnets. Furthermore, it is impossible to transmit power from the angle sensor to the shaft in order to supply further measurement sensors, for example for torque measurement, there.

International Patent Disclosure WO 95/31696, corresponding to U.S. Pat. No. 5,815,091, describes a linear position identification system, which has a stationary antenna device with a pair of spiral coils and an excitation coil. In this case, the mean flux from the two spiral coils cancels itself out. Currents are induced in the spiral coils by use of a tuned circuit having a resonant response, and the amplitude of these currents represents a measure of the position of the tuned circuit.

In addition, antenna transponder configurations are known in which power is transmitted from a stationary antenna to a rotating transponder, and the position of the transponder can be measured as a result of at least one coil element of the stationary antenna having a meandering form. Such configurations provide a meandering antenna for detecting the angle position. The electromagnetic coupling to the environment is very high due to the large area enclosed by the stationary coil. Therefore, a large amount of power is required to produce a desired magnetic field intensity. In addition, the interference emission to the environment is high and, finally, the sensitivity to radiated interference in the primary circuit is high.

SUMMARY OF THE INVENTION

It is accordingly an object of the invention to provide an antenna transponder configuration for power transmission and angle measurement that overcomes the above-mentioned disadvantages of the prior art devices of this general type, in which it is possible to determine the position of a rotating transponder relative to a stationary antenna device as accurately as possible and with as little sensitivity to interference as possible.

With the foregoing and other objects in view there is provided, in accordance with the invention, an antenna transponder for angle measurement and data transmission. The antenna transponder is formed of a stationary antenna device having at least two concentric coils with different mean radii and each of the two concentric coils have an interior. At least one of the two concentric coils is a meandering coil and mean flux in the interior of the two concentric coils approximately cancels itself out. A rotatable part is disposed opposite the stationary antenna device. A transponder is disposed on the rotatable part, and the stationary antenna device and the transponder define an air gap there-between.

At least two coils are used in the stator (stationary antenna device) and lead to alternating magnetic fluxes along a predetermined radius, which is also the rotation radius of the rotor (with the transponder). In this case, the coils of the stationary antenna device are configured and are provided with current of the known polarity such that the resultant field in the innermost area, which is common to all the coils, largely cancels itself out. The configuration can be configured such that one coil is in the form of a meandering coil and the other is smooth, such that two coils are smooth and one is meandering, or such that there are two meandering coils. This results in a reduction in the inductance, the susceptibility to radiated interference, and the radiated emissions of the configuration. If we regard the antenna coils as the primary of a transformer with a large air gap, and the coils of the rotor as the secondary of a transformer, then, to a first approximation, the amount of coupling is proportional to the superimposed areas. A coupling level of 1 would be desirable, but this can never be achieved. Reducing the magnetically active area of the primary coil configuration considerably increases the amount of coupling for a given, constant secondary coil area.

A further problem with such configurations is the major reduction in the amount of coupling as the air gap becomes larger, with the voltage induced in the secondary likewise then decreasing to a major extent. This is a poor precondition for accurate position determination. In order to improve this phenomenon, the position measurement is based on a ratio measurement. This is done by comparing the voltage $U_1$, which represents the position, with the comparison voltage $U_2$, with both voltages being equally proportional to the air gap.

In accordance with an added feature of the invention, a shaft is provided on which the rotatable part is connected. A torque sensor is further provided. The transponder detects measured torque data from the torque sensor, a torque being transmitted on the shaft and the shaft is mounted such that it can rotate. The transponder transmits the measured torque data to the stationary antenna device.

In accordance with an additional feature of the invention, an evaluation circuit is electrically conductively connected to the transponder and evaluates the measured torque data from the torque sensor. The transponder has a coil for supplying power to the evaluation circuit, a voltage induced by the coil is rectified and passed to the evaluation circuit.

In accordance with another feature of the invention, the transponder transmits a first measured variable being a resistive part, and a second measured variable being a capacitive part, to the stationary antenna device.

With the foregoing and other objects in view there is provided, in accordance with the invention, a combination of a manufactured device with an antenna transponder for measuring an angular position of the manufactured device. The antenna transponder contains a stationary antenna device having at least two concentric coils with different mean radii and each of the two concentric coils have an interior. At least one of the two concentric coils is a meandering coil and a mean flux in the interior of the two concentric coils approximately cancels itself out. A rotatable is part disposed on the manufactured device. A transponder is disposed on the rotatable part, and the stationary antenna device and the transponder defining an air gap therebetween. A first operating state which exists once the manufactured device is started up and represents a learning state of the manufactured device, and a second operating state corresponding to a normal operation of the manufactured device are derived, the first operating state and the second operating state are taken into account by comparing them for adapting a measured angle position signal to possible manufacturing inaccuracies of the manufactured device.

Other features which are considered as characteristic for the invention are set forth in the appended claims.

Although the invention is illustrated and described herein as embodied in an antenna transponder configuration for power transmission and angle measurement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a configuration for angle measurement which is described first in the following text. This is then followed by an explanation of torque measurement, data transmission for angle position determination, signal preprocessing and angle measurement using a rotary encoder for such an configuration.

Angle measurement

Figure 1:
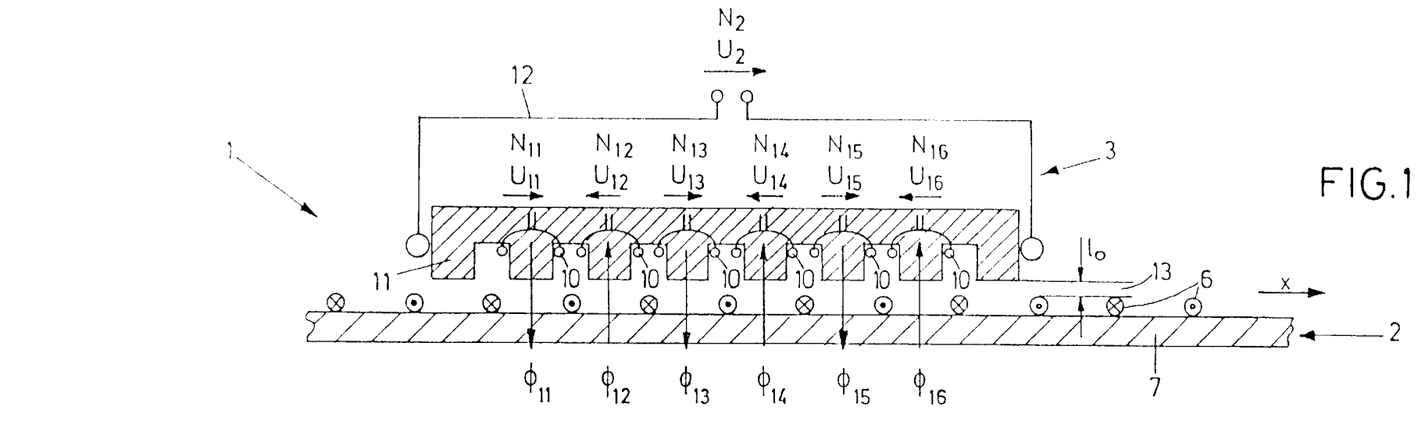
FIG. 1 is a diagrammatic, cross-sectional view of an antenna transponder configuration according to the invention.

An antenna transponder configuration 1 has, as shown in FIG. 1, a stationary antenna device 2 and a transponder 3 that is disposed such that it can rotate.

Such antenna transponder configurations 1 are used to transmit power from the antenna device 2 to the rotating transponder 3, and to determine a relative position of the transponder 3 with respect to the antenna device 2.

Figure 5:
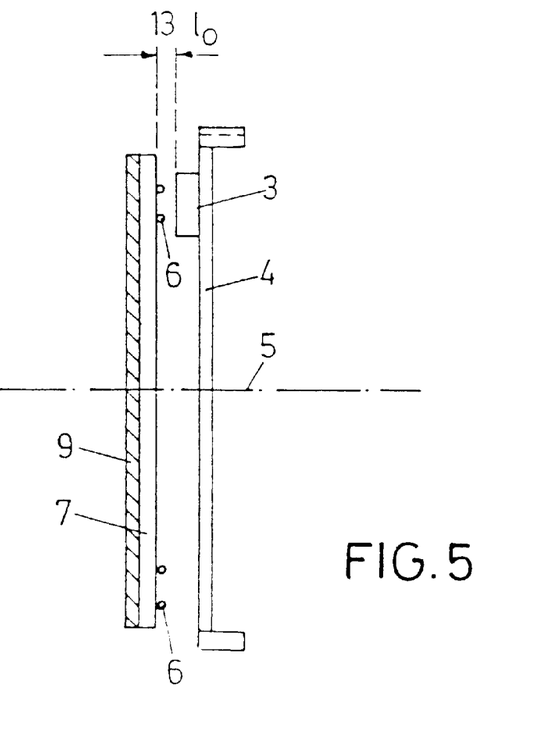
FIG. 5 is a cross-sectional view of the configuration shown in FIG. 1.

The transponder 3 is, as shown in FIG. 5, disposed on a rotating disk 4, which is mounted such that it can rotate about a shaft 5. The antenna transponder configuration 1 allows the position of the shaft 5 relative to the stationary antenna device 2 to be determined by the transponder 3.

The stationary antenna device 2 includes a meandering coil 6, which is mounted on an insulating plate 7.

Figure 2:
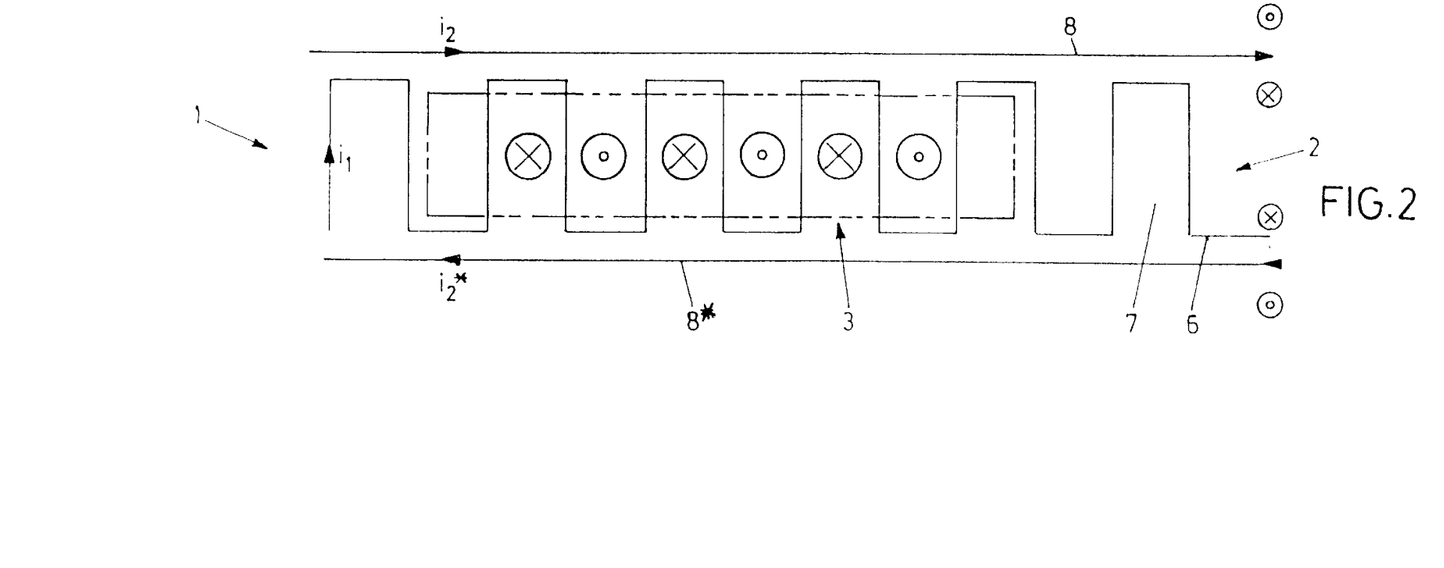
FIG. 2 is a plan view of the antenna transponder configuration shown in FIG. 1.
Figure 6:
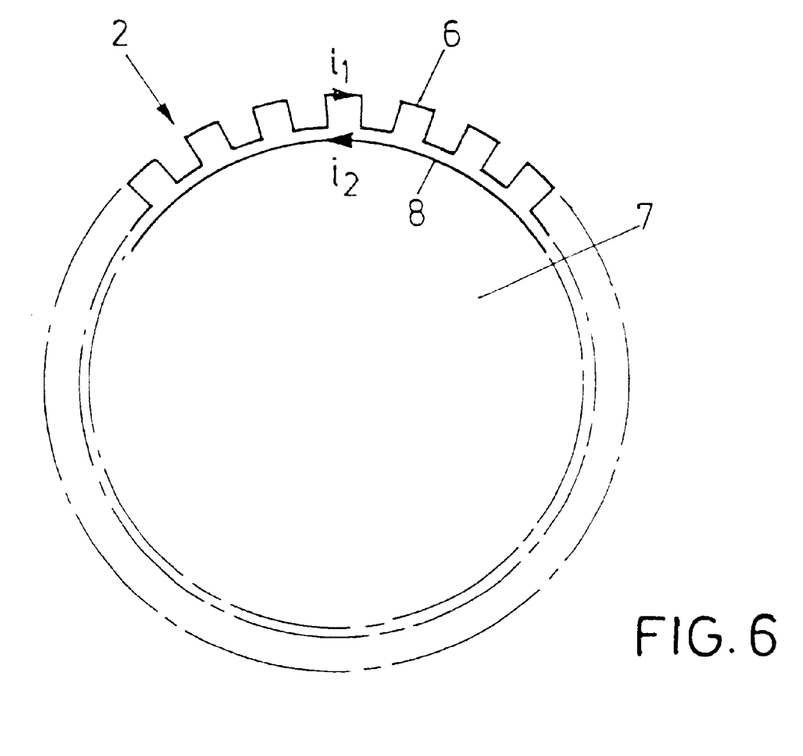
FIG. 6 is a side-elevational view of an antenna configuration shown in FIG. 1 having a meandering coil and a smooth coil.

The meandering coil 6 is concentrically surrounded by at least one smooth coil 8, which follows the outer or inner contour and may also be formed on both sides. All the coil elements of the stationary part are mounted on the plate 7. In order that the resultant magnetic flux in the interior of all the coils disappears as far as possible, the excitation currents in the coil elements are selected to be inversely proportional to the respective radius. FIG. 2 shows two smooth conductors 8, 8* and FIG. 6 shows a single smooth conductor B.

Figure 4:
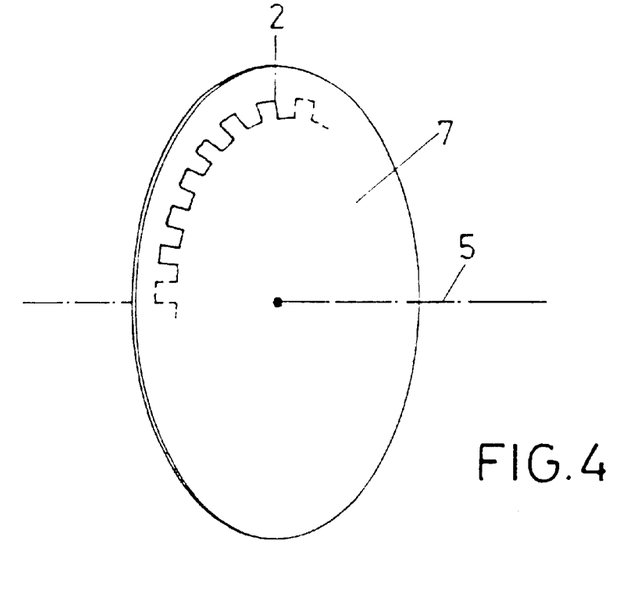
FIG. 4 is a detailed, perspective view of the configuration shown in FIG. 1 having an antenna device on a plate, which is disposed around a shaft.

The illustrations in FIGS. 1 and 2 relate only to a detail of the antenna device 2, so that the curvature of the entire configuration cannot be seen there. FIG. 4 shows a perspective illustration of a part of the antenna device 2 on the plate 7. FIG. 6 shows an axial view of an embodiment according to the invention of the stationary antenna device 2 having the meandering coil 6 and a concentric, smooth coil 8 following the inner contour.

The overall efficiency of the configuration can be improved if, as shown in FIG. 5, a magnetically highly conductive sheet 9 is bonded onto the rear face of the rotating plate 7 of the stationary antenna device, and short-circuits the magnetic lines of force on this side of the antenna transponder configuration 1.

Figure 3:
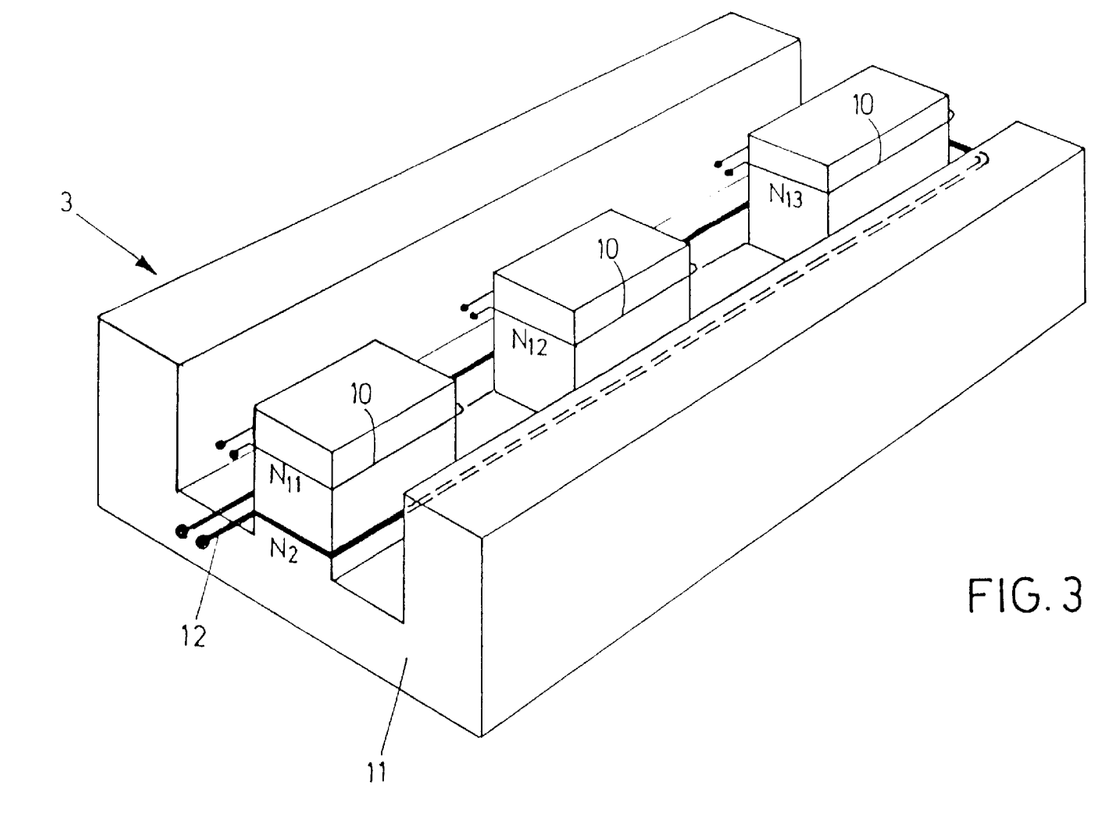
FIG. 3 is a perspective, partial view of the transponder having a ferrite that carries a field.

The transponder 3 has a configuration of coils 10 in a row, which are connected in series in such a way that their induced voltages are added to one another (FIGS. 1 and 3). A rotor, which has the transponder 3, draws its power from the alternating magnetic field via a secondary inductance in which a voltage is induced, in accordance with induction law. In order to allow the angle position of the rotor to be detected as accurately as possible, that part of the coil which is used for position detection and consists of the windings $N_{11}\ldots N_{1n}$—also referred to as the coils 10 in the following text—is configured for maximum voltage amplitudes, so that the pitch matches the pitch of the meandering coil element 6 of the stator. When the rotor rotates, an amplitude-modulated induced voltage is produced in the coils if the excitation from the stator coils is AC excitation, and an approximately sinusoidal voltage, which is highly dependent on the rotation speed, is produced if the excitation from the stator coils is DC excitation.

If two smooth coil elements 8 are used on the primary, then one winding $N_2$ can be used on the secondary (rotor or transponder side). This is then primarily used for power transmission. It can optionally be used in conjunction with the meandering coil 6 on the primary in order to provide a comparison voltage for the voltage which is induced in the coils $N_{11}\ldots N_{1n}$, and makes the position measurement independent of varying air gaps.

The coils are disposed on a ferrite 11 which carries the field and through which the magnetic fluxes of the coils $N_{11}$ to $N_{16}$, namely $\phi_{11}$ to $\phi_{16}$, are passed.

The configuration of the coils 10 is surrounded by an entire coil 12, which surrounds the configuration of the coils 10 once or more than once. The voltage induced in the entire coil 12, which is also referred to as $N_2$, is denoted by $U_2$.

In one preferred embodiment, the entire coil 12 may also be embedded in the ferrite 11 that carries the field, as is shown in FIG. 3. This improves the magnetic path for the entire coil 12.

There is an air gap 13, whose average width is $l_0$, between the antenna device 2 and the transponder 3 (FIGS. 1 and 5). The width of the air gap 13 can vary between 1 mm and 3 mm, first because of manufacturing tolerances, and second because of environmental influences during operation. These fluctuations make position measurement difficult.

During operation, a current $i_1$ flows through the meandering coil 6 (FIG. 6). A current $i_2$ flows in the smooth conductor 8. If the configuration shown in FIG. 4 contains only the meandering coil 6, then the flux, inductance, current and voltage on the coil would be determined by the number of turns and the total area within the meandering loop 6. This would also apply to the radiated emissions and the susceptibility to radiated interference.

If, in addition to the meandering coil 6, the smooth coil 8 is provided as shown in FIG. 6, and if the current in the same phase flows through both coils in the direction shown, and the current is inversely proportional to the mean radius of the two coils, then the two coils each produce a magnetic field of the same magnitude but in the opposite direction in their common inner surface, as a result of which the overall flux approximately disappears. This results in a considerably smaller inductance, less susceptibility to radiated interference, reduced radiated emissions and a considerably improved amount of coupling between the primary and secondary of the configuration, per turn. The magnetic flux through the coils is proportional to the excitation, that is to say to the product of the number of turns and current, as long as there are no magnetically conductive materials in the vicinity. The circles with dots or crosses shown in the figures show either the current flow direction or the direction of magnetic lines of force at right angles to the plane of the drawing, and out of the drawing or into it.

In summary, the method for measurement of the angle position, is which is intended to operate independently of air gap changes, is based on the following. If the transponder 3 is moved in front of and parallel to the antenna device 2 through which current flows, then voltages $U_{11}$ to $U_{16}$ are induced in the coils 10. If the position of the transponder 3, and thus of the shaft 5, is detected by measuring the induced voltages $U_{11}$ to $U_{16}$ using a Schmitt trigger, then the air gap changes result in a measurement inaccuracy which has an interfering effect. The entire coil 12 essentially measures the flux that is produced by the current $i_2$ in the smooth coil 8. The voltage $U_2$ induced in consequence is dependent on the air gap to the same extent as the voltages $U_{11}$ to $U_{16}$. The sum of the induced voltages $U_{11}$ to $U_{16}$ is denoted $U_1$, with the coils 10, as mentioned above, being connected in series in such a way that the individual voltages are added to one another.

If the two voltages $U_1$ and $U_2$ obtained in this way are compared with one another in a comparison circuit (see FIG. 7), then the correct position in front of the meandering coil 6 is always obtained, irrespective of the air gap. The voltage $U_2$ induced in the entire coil 12 depends on the width of the air gap 13 and the movement position of the transponder 3 relative to the antenna device 2. The position in FIGS. 1 and 2 moves in a direction that is referred to as the x direction.

The relationship between the flux and the secondary coil 12 is governed by the Biot-Savart Law and can be calculated using the known elliptical integrals, provided there is no magnetically conductive material in the vicinity of the conductors that carry the current. The essential feature here is that the magnetic field in the vicinity of a circular coil has a highly non-linear behavior and decreases rapidly with the distance from the coil. This decrease in the field strength is associated with the reduction, which is proportional to this, in the voltage $U_2$ induced in the entire coil 12, ignoring the influences of the internal resistance and other physical effects here. One is therefore in a frequency range where the capacitive currents in the field and resistive voltage drops in the conductors can be ignored.

If the aim is now to measure the position of the moving part, that is to say of the transponder 3, for example by measuring the zero crossings of the amplitude of the induced voltage, then it is necessary to use a measurement instrument, for example a Schmitt trigger, with a fixed threshold. If the amplitude of the induced voltage now varies as a consequence of a change in the air gap, then the measurement instrument assesses this as a change in the field, and thus a change in the induced voltage, and measures an incorrect change in distance. According to the invention, this problem is solved by a comparison measurement in the proposed manner.

If one considers only the peak values of the voltages or only the root-mean square values of the voltages or the rectified arithmetic mean values of the voltages, then the following expressions apply:

$$U_1(l_0,x):=f(i_1)\cdot f(\text{Geometry})\cdot f(l_0)\cdot f(x)$$

$$U_2(l_0):=f(i_2)\cdot f(\text{Geometry})\cdot f(l_0)$$

$$U:=U_1(l_0,x)-U_2(l_0)=f(\text{Geometry})f(l_0)[f(i_1)f(x)-f(i_2)]$$

If the ratio of the two primary currents to one another is now selected such that the inequalities are eliminated, then this gives:

$$U=f(\text{Geometry})f(l_0)f(i_1,i_2)[f(x)-1].$$

The measurement task is thus reduced to measurement of the zero crossings.

For further simplification, it is possible to use impressed currents. In this case, there is no need for any physical, smooth return conductor for the current $i_1$ on the primary, that is to say the side of the antenna device 2, rather the current is selected to be $i_2^*:=i_2+i_1$ (return). This is shown in FIG. 2.

As already mentioned above and as shown in FIG. 3, a further development of the moving transponder 3 envisages a magnetic short circuit to provide a better field routing. In consequence, a greater induced voltage per turn is available on the secondary.

Since the division ratio is chosen to be the same, the coils $N_{11}$ to $N_{16}$ are always positioned such that they all receive the same amount of flux. Positions occur with a maximum total flux, and there is one position with a minimum total flux.

Depending on whether an even or odd number of windings is chosen, a rising or an alternating response can be expected. Both cases are based on the principle of comparison with a voltage that is dependent on the air gap in the same way.

Figure 7:
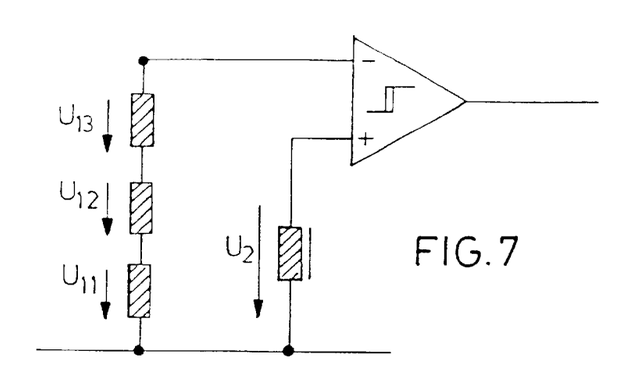
FIG. 7 is a circuit diagram of an evaluation circuit for the configuration shown in FIG. 1.

FIG. 7 shows, schematically, the comparison circuit for comparing the ratios of the two voltages $U_1$ and $U_2$. The nature of the ratio comparison is based on operational amplifiers normally being available which have two inputs that are virtually identical to one another, one being an inverting input, and the other being a non-inverting input. In certain situations, as already mentioned above, a Schmitt trigger may also be used. Hysteresis is necessary for circuit stability. However, this makes the measurement accuracy worse. A better solution is therefore provided by hysteresis whose value is proportional to $U_2$. The correct position of the meandering coil 6 is in consequence detected considerably better than would be the case with just one fixed comparison voltage. The influence of the air gap in conjunction with a non-linear increase or decrease in the voltages to be compared would then be considerably less significant.

Figure 8:
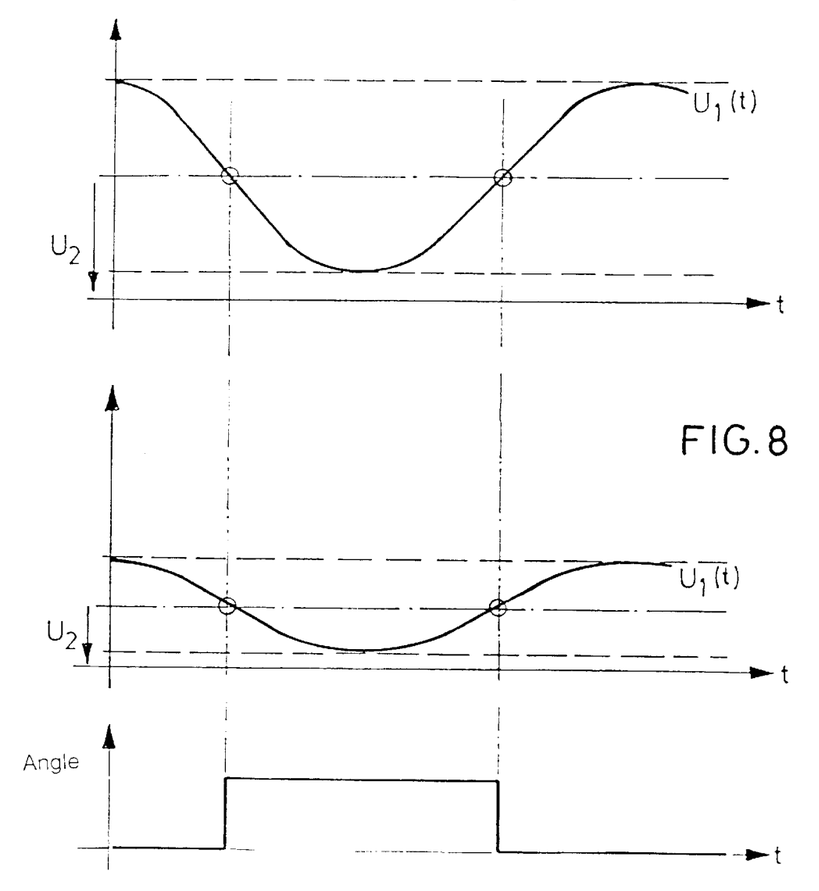
FIG. 8 is a graph showing temporal characteristics of an induced voltage $U_1$ for various air gap widths.

The topmost illustration in FIG. 8 shows the induced voltage $U_1$ as a function of time for a small gap width $l_0$.

The illustration in the center of FIG. 8 shows the voltage $U_1$ as a function of time for a larger air gap. As can be seen, the amplitude of $U_1$ is reduced if the air gap is larger. This is due to the reduced magnetic flux that passes through the coils 10. If the difference between the voltages $U_1$ and $U_2$ is now formed, then the difference voltage has zero crossings which are important for determining the position of the transponder 3.

The output signal from the circuit illustrated in FIG. 7 is shown as the lowermost graph in FIG. 8. The difference voltage is a measure of the position of the transponder 3 relative to the antenna device 2. If the transponder 3 moves through $\Delta x$ in front of the antenna device 2, then this is a measure of the angle change of the disk 4 relative to the plate 7. It is thus possible to use the above method to measure the shaft position irrespective of the air gap width.

Figure 10:
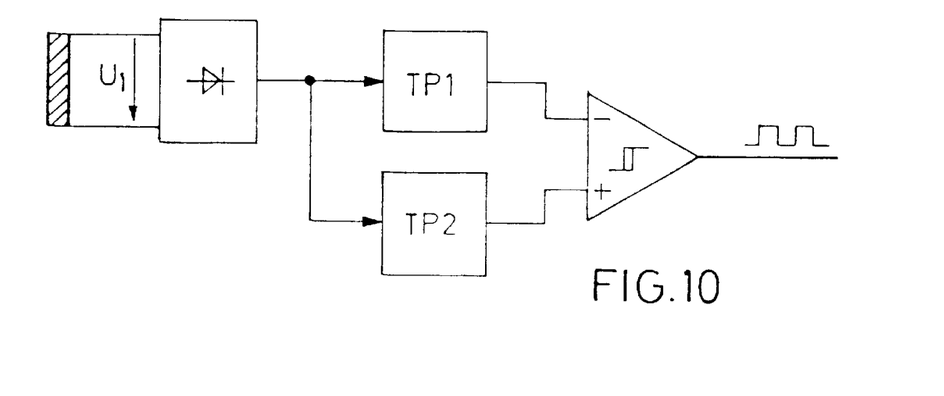
FIG. 10 is a circuit diagram of a rectifier for a configuration for angle measurement.

If the voltage across the individual coils $N_{11}$ to $N_{16}$ is sufficiently large, then there is no need for the second coil $N_2$, that is to say the entire coil 12, and the comparison voltage is in consequence obtained by rectifying the voltages $U_{11}$ to $U_{16}$ and adding them to one another, and by comparing the ratio of the voltage $U_2^*$ obtained in this way with the voltage $U_1$. The rest of the method is then as described above. Owing to the physical laws on which they are based, rectifiers have a threshold voltage, particularly at relatively high frequencies, whose effect can be reduced by using operational amplifiers. However, this is not entirely feasible. If the voltage of an individual coil 10 is sufficiently large, for example considerably greater than the threshold voltage, then, as mentioned above, there is no need for the entire coil 12 since the rectification process produces precisely the comparison voltage which is required to operate the system. However, this is limited to a system with a bias voltage response. A corresponding circuit configuration is shown in FIG. 10.

Torque Measurement

The antenna transponder configuration 1 according to the invention also makes it possible to transmit measured data that are detected by the transponder 3. This is possible, for example, for the torque that is transmitted on the shaft S. For this purpose, the induced voltage $U_2$ is rectified and is used as a power supply, in which case a tuned circuit can be formed in order to operate the evaluation circuit. One known method is described in German Patent DE 39 22 556 C2.

In this system, the torque is measured by measuring a change in distance. The applied torque leads to deformation of a sensor element, thus resulting in a different distance, or a change in distance, between predetermined points.

The change in distance is produced by the torque that is transmitted via the shaft 5. The change in distance can be measured by strain gages. However, this can also be done by a capacitor whose plates are moved with respect to one another. If, furthermore, the measurement accuracy need not be particularly high, then the following simplification is possible.

The angle is measured using the induced voltage and the secondary magnetic field caused by this in the coils $N_{11}$ to $N_{16}$. In consequence, a current that is governed by the induced voltage and the resistance $R_2$ flows in the secondary. This can be measured by the reaction on the primary. The torque is determined by off-tuning the resonant frequency of the tuned circuit $N_2+C$ provided on the secondary side and, once again, by measurement on the primary side.

In summary, a change in the real part of the current drawn by the antenna device 2 must be measured on the primary side, and, also, the imaginary part of the current drawn. Both variables may be shifted through a specific phase angle, which depends essentially on the air gap 13. To this end, the measured values must be related to one another by subtraction.

Figure 9:
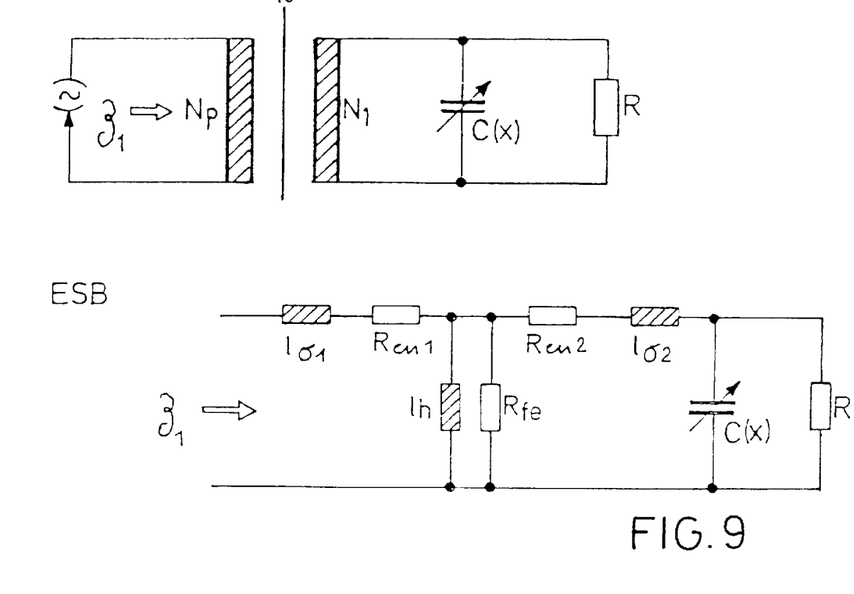
FIG. 9 is a circuit diagram of the antenna transponder configuration with its equivalent circuit for the configuration as shown in accordance with FIG. 1 for passive torque measurement.

FIG. 9 shows an equivalent circuit for the above method. This assumes a large air gap. In order to allow the current and voltage in the primary to be measured, the primary is operated with an impressed current. There is a passive network on the primary side, whose individual components depend both on the angle position (antenna device 2 relative to the transponder 3) and on the torque (value of the capacitor for distance measurement). This network is measured, compared with a table, and the measured values for the angle position and torque are derived from this.

In the configuration shown in FIG. 5, the plate 7 on which the antenna device 2 is disposed is connected to an engine which, in FIG. 5, is located to the left of the plate 7 and is not shown. A gearbox is connected to the disk 4 and, in FIG. 5, although it is once again not shown, is disposed to the right alongside the disk 4. The meandering coil 6 that is mounted on the plate 7 can be used to detect the angle position of the shaft 5, for example of the crankshaft or of the camshaft relative to the engine block.

Data Transmission for Angle Position Determination

Figure 11:
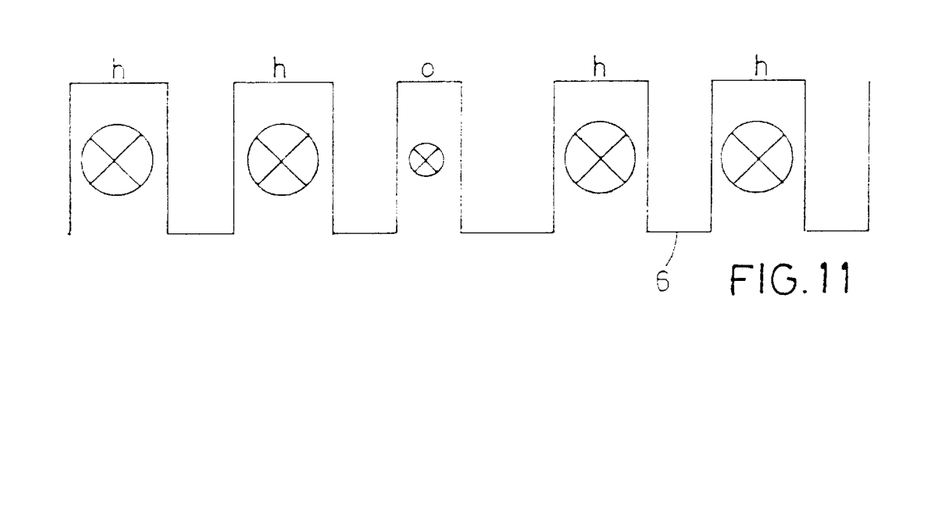
FIG. 11 is an illustration of a meandering coil with special coding for the meandering loop width.

In order to determine the angle position of the transponder 3 relative to the antenna device 2, a meander in the meandering coil 6 is, as shown in FIG. 11, provided, with different distances between the individual loops. In this way, a corresponding change in the periodicity of the induced voltage $U_1$ is produced. In FIG. 11, a width of the meanders of the meandering coil 6 is denoted by h and o. On the side where the transponder 3 is, the angle position can be determined in two ways. The coarse position is determined by decoding the signal sequence h and o. The fine position is found by counting off the zero crossings.

Figure 12:
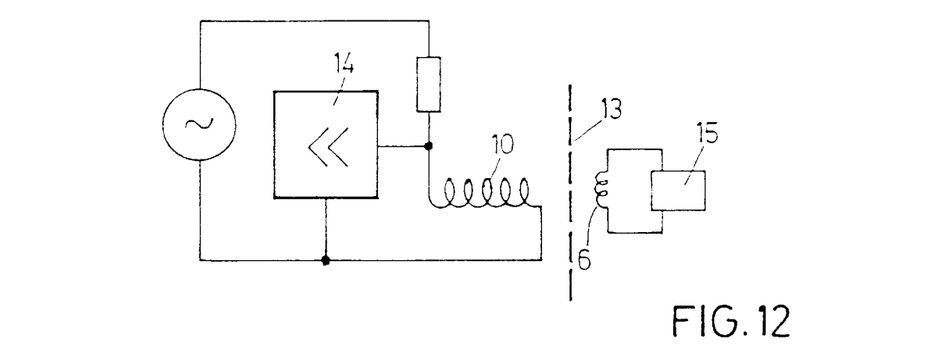
FIG. 12 is a circuit diagram of an equivalent circuit for a measurement configuration of the configuration shown in FIG. 11.

FIG. 12 shows a measurement configuration as an equivalent circuit, using which angles can be measured using the above methods. In particular, this shows power being fed separately into the meandering coil 6, and the measurement with the associated coil 10. The joint use of the coil 10 as a power transmitter and as a measurement receiver for the meandering coil 6 is worthy of mention. According to FIG. 12, the measurement is carried out by a measurement unit 14. A network 15 is connected on the side where the meandering coil 6 is located.

Figure 13:
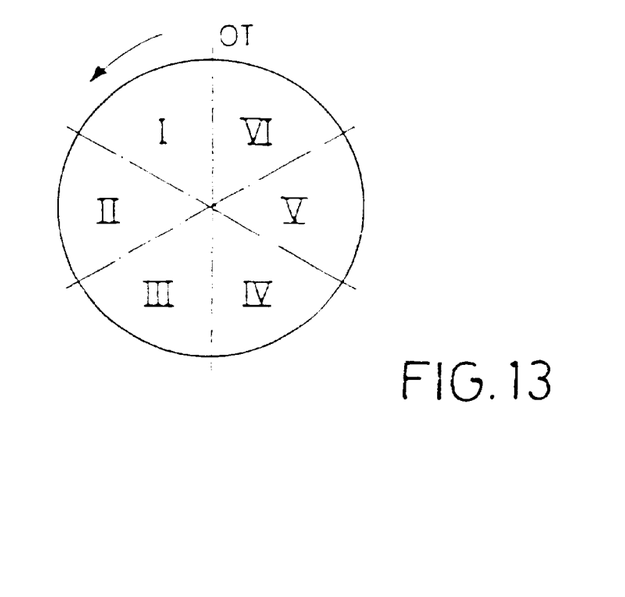
FIG. 13 shows an angle segment subdivision for the configuration for rapid segment identification.

The precise determination of the angle position of the crankshaft or camshaft 5 with respect to a stationary engine block is important in order to identify the top dead center and to allow different crankshaft angle ranges to be distinguished from one another without having to wait for at least one complete revolution of the-shaft 5, in order, for example, to identify the top dead center. As has already been described above, the angle position is determined by coding of the distances between the meander loops of the meandering coil 6. FIG. 13 shows segmentation of different angle ranges. If, for example, there are 60 teeth, then angle ranges of 6° each can be measured. The measurement is carried out by determining the zero crossings of the induced difference voltage. The angle range is coded by combining a number of successive teeth to form a code word so that, in this way, it is possible after passing through, for example, five teeth to discern the angle segment of (5/60)*360° in which the transponder 3 is located relative to the antenna device 2. The evaluation is carried out, for example, by measuring the time from the zero crossing to the inverse zero crossing, or by counting off using a second constant meander track. The measurement method can now also be carried on the primary side, by short-circuiting the rotating sensor coil or terminating it with any desired network, so that a current flows in the rotating sensor coil. The required measurement can then be carried out on the primary side since, then, the secondary of the air-cored transformer produced by the antenna transponder configuration 1 is short-circuited or terminated in a defined manner.

If an alternating current, for example at 125 kHz is used to supply the primary, then the method is also suitable for very low rotation speeds. In this case, however, the sudden phase change on changing from one tooth to the next must be measured, or a phase comparison must be carried out with regard to a constant meander.

Figure 14:
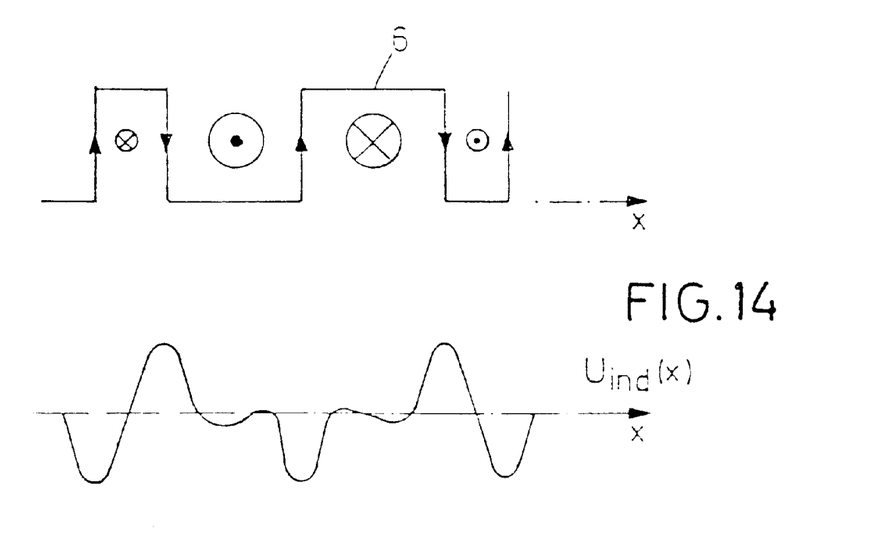
FIG. 14 shows the relationship between various loop widths of the meandering coil and the associated induced voltage as a function of location.

FIG. 14 shows the relationship between a coded sequence of meander loops of the meandering coil 6 and the associated induced voltage as a function of location, that is to say x. The coding by selection of different meander loop distances continues, as is shown in FIG. 14, at the zero crossings of the induced voltage. If the coding is known, the angle position can be determined from these zero crossings.

Preprocessing of the Signal From the Angle Sensor

The angle position of the crankshaft and of the camshaft relative to the engine block are intended to be detected as accurately as possible. Systematic errors occur in the evaluation of the measurement signals, such as center offset, fluctuations in the distance between the probe and the encoder, manufacturing tolerances, thermally induced changes in the mechanical dimensions and the electrical data, etc. Furthermore, random measurement errors occur, such as noise, transmission errors, supply voltage fluctuations, etc.

The evaluation takes account of two different operating states. The first operating state occurs once the appliance has been started up and represents the learning state of the appliance. The second operating state takes place in normal operation and is distinguished by the possibility of adaptation to the aging of the vehicle in which the shaft 5 is fitted.

The following text describes a first operating state, that is to say the learning state. Successive relative minima and relative maxima of the angle signal are used as points for determining the respective angle position. If, to a first approximation, a triangular waveform nominal signal or, for example, a sinusoidal signal for the individual meanders is assumed, together with an approximately constant change in amplitude during one revolution of the shaft, then, to a first approximation, the zero crossing of the meander can be calculated from this, thus leading to usable results for the position of the crankshaft or camshaft. The greatest inaccuracies in this case occur at those points where the center line has inversion points. The center line is stored in a table and is continuously averaged using relatively new measurement points. After a certain amount of time, the center line then represents the systematic error profile, and is stored as a function of the rotation angle.

In a second state, that is to say the normal operation state, the measured values for the angle position are referred to the center line, first by subtraction and second by taking account of the rotation speed and/or temperature and/or vehicle age, etc. In this way, it is possible to determine the actual zero crossing of the signal very accurately. If any discrepancies that could not be expected occur in this state, then an entire or partial malfunction can be assumed.

Angle Measurement Using a Passive Rotating Encoder

Figure 15:
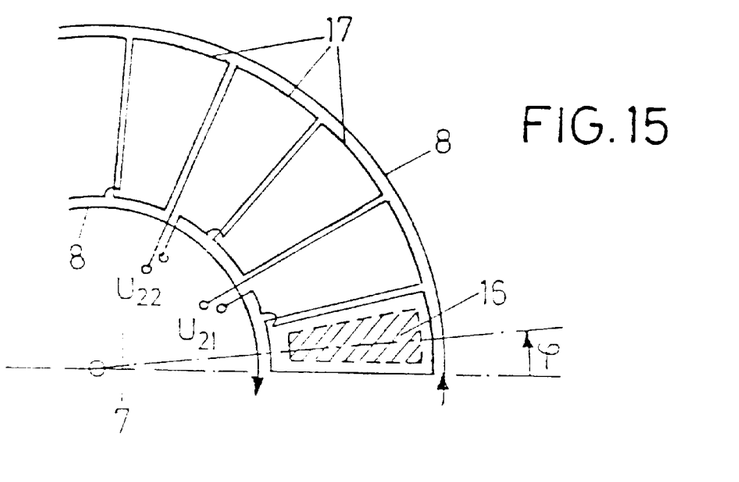
FIG. 15 shows the configuration according to the invention for angle measurement having a passive rotary encoder with an even number of measurement coils.
Figure 17:
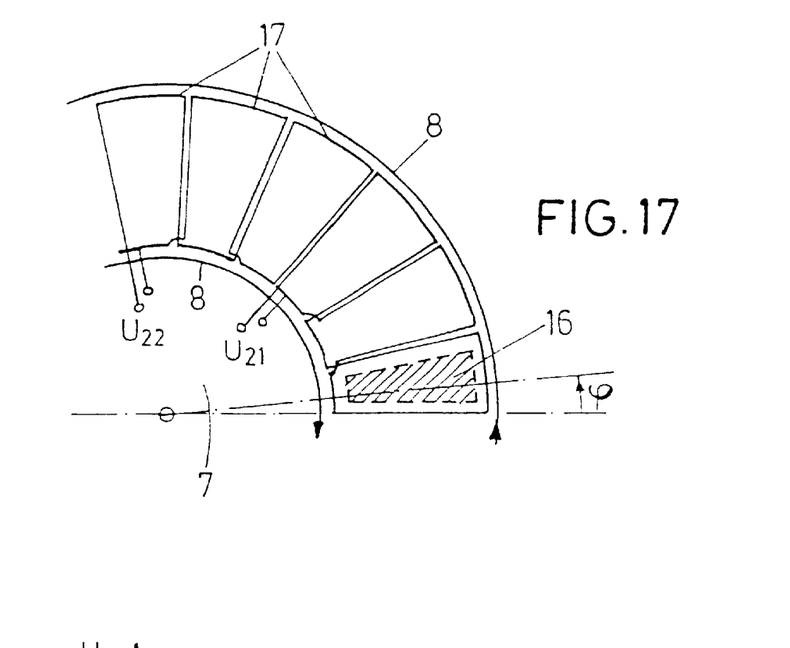
FIG. 17 shows the configuration according to the invention for angle measurement having the passive rotary encoder with an odd number of measurement coils.

The stationary measurement apparatus shown in FIGS. 15 and 17 contains two smooth primary coils 8 in order to produce the primary magnetic flux. A material whose magnetic behavior is different to that of air, for example a ferrite tooth 16, is used as the rotating component producing the angle position. The power transmission to the transponder 3 and the data transmission from the rotor, that is to say the transponder 3, to the stator, that is to say the antenna device 2, are carried out via the smooth and uniform primary coil 8, and the magnetic flux which is associated with it. The angle position of the ferrite tooth 16 is detected via a number of meandering measurement coils 17, which are likewise disposed such that they are stationary within the concentric coils 8, or in their immediate vicinity.

The modulation of the flux can be selected by choosing the number of subdivisions, for example with 10*6 meandering coils, depending on the desired accuracy and simplicity of the evaluation. The numerical ratio described produces the very suitable modulation of 1:10.

The evaluation of the signals and the preprocessing for a higher-level controller are carried out in an evaluation circuit (not shown in FIGS. 15 and 17) whose number of inputs corresponds to the number of measurement coils 17 provided. As stated above, the evaluation can be carried out using a comparison circuit, in which case the input signals to be evaluated would now need to be six times as great in this configuration.

As already mentioned above, the inner and the outer smooth coils 8 are mounted on the plate 7 in FIGS. 15 and 17. Furthermore, the numerous meandering measurement coils 17 are provided. The ferrite tooth 16 that can rotate is located above them, separated by the air gap 13.

Figure 16:
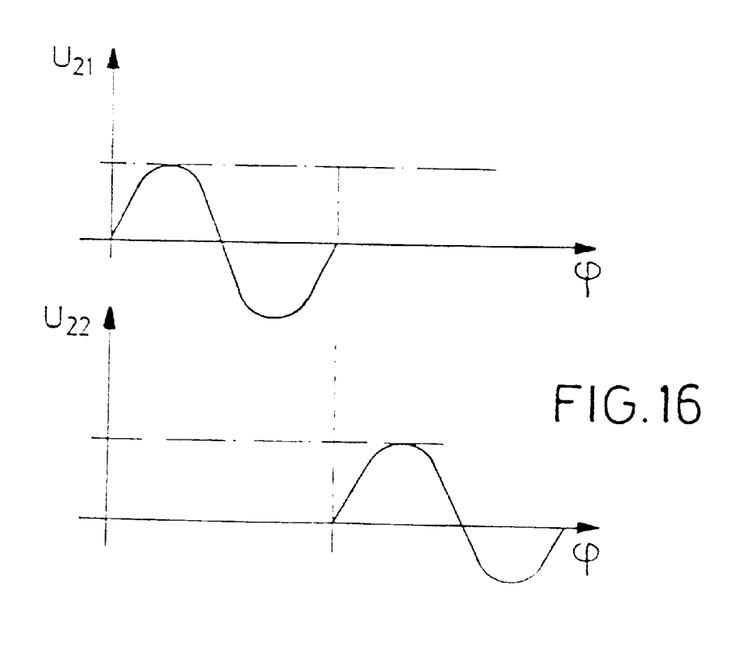
FIG. 16 is a graph showing the voltages induced in the configuration shown in FIG. 15 with an even number of measurement coils.
Figure 18:
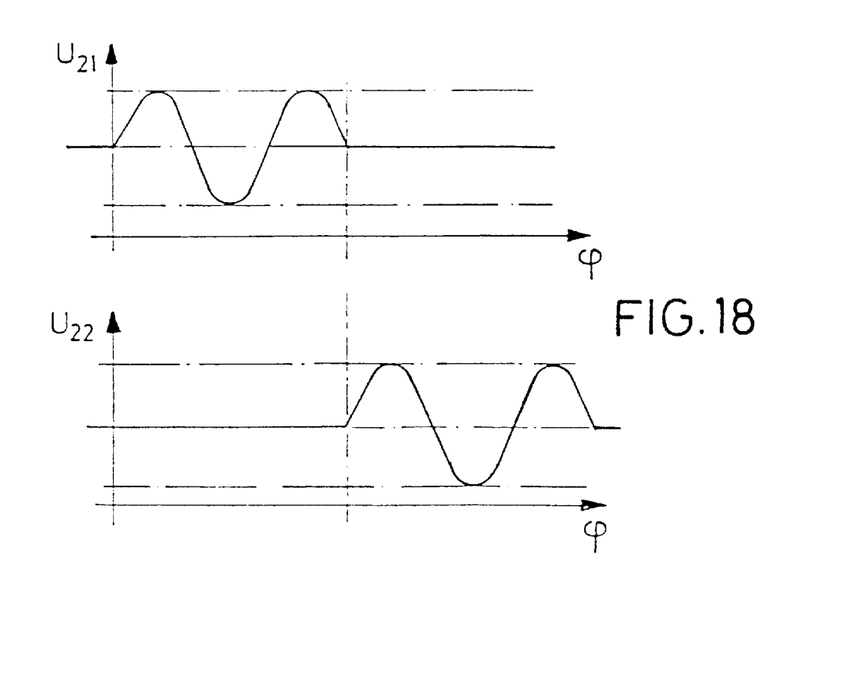
FIG. 18 is a graph showing the voltages induced in the configuration as shown in FIG. 17.

FIGS. 16 and 18 show the induced voltages $U_{22}$ and $U_{21}$. FIGS. 15 and 16 relate to an even number of measurement coils 17,: and FIGS. 17 and 18 to an odd number of measurement coils 17.

If one also wishes to detect the position when the sensor is at rest, then the primary coil is excited using an alternating current, for example at a frequency of 125 kHz. If only the position of the moving sensor need be detected, then it is sufficient to excite the primary coil with direct current, or to form the magnetic field using a permanent magnet instead of the ferrite tooth 16.

As has already been mentioned above, the magnetic path for the magnetic flux can be improved by bonding the magnetically highly conductive sheet 9 on the rear face of the rotating plate 7 of the stationary antenna device 2, in which case the sheet 9 short-circuits the magnetic lines of force on this side. Furthermore, the functions of the rotor and stator can be interchanged.

The meandering measurement coils 17 may also be segmented such that they overlap, depending on the angle signal resolution that is intended to be achieved. However, other interfering influences are also present, for example housing parts that also rotate and are electrically conductive and/or magnetically conductive. In order to minimize these interfering influences, a corresponding, likewise purely passive component, which represents only the interfering influences and also rotates, can be provided on the diametrically opposite side. The difference in the signal between the opposite meander segments is then always formed in the evaluation circuit.

I claim:

1. An antenna transponder for angle measurement and data transmission, comprising:

a stationary antenna device having at least two concentric coils with different mean radii and each of said two concentric coils having an interior, at least one of said two concentric coils is a meandering coil and a mean flux in said interior of said two concentric coils approximately canceling itself out;

a rotatable part disposed opposite said stationary antenna device; and a transponder disposed on said rotatable part, and said stationary antenna device and said transponder defining an air gap there-between.

2. The antenna transponder according to claim 1, including:

a shaft on which said rotatable part is connected; and a torque sensor, said transponder detecting measured torque data from said torque sensor, a torque being transmitted on said shaft and said shaft is mounted such that it can rotate, and said transponder transmits the measured torque data to said stationary antenna device.

3. The antenna transponder according to claim 2, including an evaluation circuit electrically conductively connected to said transponder and evaluating the measured torque data from said torque sensor, said transponder having a coil for supplying power to said evaluation circuit, a voltage induced by said coil is rectified and passed to said evaluation circuit.

4. The antenna transponder according to claim 1, wherein said transponder transmits a first measured variable being a resistive part, and a second measured variable being a capacitive part, to said stationary antenna device.

* * * * *